(12) United States Patent
Wang et al.

(10) Patent No.: US 11,429,313 B2
(45) Date of Patent: Aug. 30, 2022

(54) DATA PROCESSING METHOD, DEVICE AND DISTRIBUTED STORAGE SYSTEM

(71) Applicant: HANGZHOU HIKVISION SYSTEM TECHNOLOGY CO., LTD., Hangzhou (CN)

(72) Inventors: Weichun Wang, Hangzhou (CN); Min Ye, Hangzhou (CN); Peng Lin, Hangzhou (CN); Qiqian Lin, Hangzhou (CN)

(73) Assignee: HANGZHOU HIKVISION SYSTEM TECHNOLOGY CO., LTD., Hangzhou (CN)

(*) Notice: Subject to any disclaimer, the term of this patent is extended or adjusted under 35 U.S.C. 154(b) by 148 days.

(21) Appl. No.: 16/755,700

(22) PCT Filed: Aug. 3, 2018

(86) PCT No.: PCT/CN2018/098655
§ 371 (c)(1),
(2) Date: Apr. 13, 2020

(87) PCT Pub. No.: WO2019/072004
PCT Pub. Date: Apr. 18, 2019

(65) Prior Publication Data
US 2020/0293229 A1    Sep. 17, 2020

(30) Foreign Application Priority Data
Oct. 13, 2017    (CN) .......................... 201710950977.3

(51) Int. Cl.
*G06F 12/00*    (2006.01)
*G06F 3/06*    (2006.01)

(52) U.S. Cl.
CPC ............ *G06F 3/0659* (2013.01); *G06F 3/064* (2013.01); *G06F 3/067* (2013.01); *G06F 3/0619* (2013.01); *G06F 3/0653* (2013.01); *G06F 3/0683* (2013.01)

(58) Field of Classification Search
CPC ..... G06F 3/0619; G06F 3/0659; G06F 3/0653
(Continued)

(56) References Cited

U.S. PATENT DOCUMENTS

| 5,774,643 A | 6/1998 | Lubbers et al. |
| 2002/0129214 A1* | 9/2002 | Sarkar ................. G06F 11/2069 711/112 |

(Continued)

FOREIGN PATENT DOCUMENTS

| CN | 101594383 | 12/2009 |
| CN | 102081584 | 6/2011 |

(Continued)

OTHER PUBLICATIONS

International Search Report and Written Opinion issued in Corresponding PCT Application No. PCT/CN2018/098655, dated Sep. 27, 2018 (English Translation of International Search Report Provided).
Extended European Search Report issued in Corresponding European Application No. 18866806.5, dated Nov. 12, 2020.

*Primary Examiner* — Mohamed M Gebril
(74) *Attorney, Agent, or Firm* — Norton Rose Fulbright US LLP

(57) ABSTRACT

A data processing method and device, and a distributed storage system are described. The method and device are applied in a dual-control storage server. The dual-control storage server comprises two controllers. If one controller fails due to abnormalities, the other controller determines the storage device managed by the failed controller, and the other controller scans the data in the determined storage (Continued)

device to obtain the metadata of the storage device, and uses the metadata to read the data stored in the determined storage device. It can be seen that in this solution, if one controller is abnormal, the other controller will take the place of the failed controller to provide external services. This improves the stability of the data storage by the dual-control storage server.

12 Claims, 2 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2014/0173280 A1* | 6/2014 | Bunker | G06F 21/44 |
| | | | 713/168 |
| 2014/0258608 A1* | 9/2014 | Viswanatha | G06F 3/0673 |
| | | | 711/113 |
| 2015/0052385 A1 | 2/2015 | Galbraith et al. | |
| 2015/0058559 A1 | 2/2015 | Jibbe et al. | |
| 2017/0092028 A1* | 3/2017 | Weicker | G07C 9/00309 |

FOREIGN PATENT DOCUMENTS

| | | |
|---|---|---|
| CN | 104021009 | 9/2014 |
| CN | 104272274 | 1/2015 |

* cited by examiner

DATA PROCESSING METHOD, DEVICE AND DISTRIBUTED STORAGE SYSTEM

CROSS-REFERENCE TO RELATED APPLICATIONS

The present application is a national phase under 35 U.S.C. § 371 of International Application No. PCT/CN2018/098655, filed Aug. 3, 2018, which claims priority to Chinese patent application No. 201710950977.3 filed with the China National Intellectual Property Administration on Oct. 13, 2017 and entitled "Data Processing Method, Device and Distributed Storage System", each of which are incorporated herein by reference in their entirety.

TECHNICAL FIELD

The present application relates to the field of distributed storage technology, and in particular, to a data processing method and device, and a distributed storage system.

BACKGROUND

At present, some storage devices contain two controllers, and are referred to as dual-control storage devices. The two controllers in the dual-control storage device share storage resources and hardware resources such as power supplies and HBA (Host Bus Adapter).

In a dual-control storage device, when one controller fails due to abnormality, for example, network or system abnormities, the other controller can continue to operate normally. In this way, the dual-control storage device can still provide somewhat normal storage services.

However, in the existing dual-control storage device, if one controller fails, abnormalities would occur to some storage services. This results in degraded stability of the data stored in the device.

SUMMARY

The objective of the embodiments of the present application is to provide a data processing method and device and a distributed storage system, so as to improve the stability of data storage by a dual-control storage device.

To achieve the above objective, an embodiment of the present application provides a data processing method, applicable to a dual-control storage server in a distributed storage system, the dual-control storage server comprises two controllers: a first controller and a second controller, the method comprises:

the first controller determining a storage device managed by the second controller after detecting an abnormality of the second controller;

the first controller scanning data in the determined storage device to obtain metadata of the storage device; and if the first controller receives a data read instruction and determines that to-be-read data to which the data read instruction is directed is stored in the determined storage device, the first controller reading the to-be-read data from the determined storage device by using the obtained metadata.

Optionally, after the first controller determines a storage device managed by the second controller, the method may further comprise:

if the first controller receives a data storage instruction and determines that a storage device corresponding to the data read instruction is the determined storage device, the first controller storing to-be-stored data corresponding to the data storage instruction in the determined storage device.

Optionally, the step of the first controller detecting an abnormality of the second controller may comprise:

the first controller sending regularly probe information to the second controller, and determining whether feedback information from the second controller is received within a preset period of time after sending the probe information; if no feedback information is received, an abnormality of the second controller is detected.

Optionally, before the first controller scanning data in the determined storage device to obtain metadata of the storage device, the method may further comprise:

the first controller determining whether metadata in the second controller has been obtained from the second controller; if the metadata has not been obtained, the first controller executes the step of scanning data in the determined storage device to obtain metadata of the storage device.

Optionally, verification information for each storage device managed by the second controller is stored in the second controller.

After the first controller scanning data in the determined storage device to obtain metadata of the storage device, the method further comprises:

the first controller generating a piece of verification information for each determined storage device, storing the verification information for the storage device to the storage device, and storing the verification information for the storage device in the first controller.

After the second controller recovers, the method further comprises:

the second controller reading verification information in each storage device managed by the second controller; determining whether the verification information in the storage device is the same as the verification information for the storage device stored in the second controller; if not the same, obtaining the metadata of the storage device from the first controller.

Optionally, after the first controller scanning data in the determined storage device to obtain metadata of the storage device, the method may further comprise:

after detecting a recovery of the second controller, the first controller sending the obtained metadata of the storage device managed by the second controller to the second controller; and the second controller receiving the metadata sent by the first controller, updating metadata stored in the second controller with the received metadata.

Optionally, the first controller detecting a recovery of the second controller comprises:

the first controller sending regularly probe information to the second controller and determining whether feedback information from the second controller is received within a preset period of time after sending the probe information; if the feedback information is received, a recovery of the second controller is determined.

In order to achieve the above objective, an embodiment of the present application further provides a data processing device applicable to a dual-control storage server in a distributed storage system. The dual-control storage server comprises two controllers: a first controller and a second controller. The device comprises a detecting module, a determining module, a scanning module and a reading module embodied in the first controller, wherein, the detecting module is configured for detecting an abnormality of the second controller, and triggering the determining module if an abnormality is detected;

the determining module is configured for determining a storage device managed by the second controller;

the scanning module is configured for scanning data in the storage device determined by the determining module to obtain metadata of the storage device; and the reading module is configured for, upon receiving a data read instruction and determining that to-be-read data to which the data read instruction is directed is stored in the storage device determined by the determining module, reading the to-be-read data from the determined storage device by using the metadata obtained by the scanning module.

Optionally, the device further comprises a storage module applied to the first controller, the storage module is configured for, upon receiving a data storage instruction and determining that a storage device corresponding to the data storage instruction is the storage device determined by the determining module, storing to-be-stored data corresponding to the data storage instruction in the determined storage device.

Optionally, the detecting module may be specifically configured for:

sending regularly probe information to the second controller, and determining whether feedback information from the second controller is received within a preset period of time after sending the probe information; if no feedback information is received, an abnormality of the second controller is detected.

Optionally, the device further comprises a judging module applied to the first controller, the judging module is configured for determining whether the first controller has obtained, from the second controller, metadata stored therein; if the metadata has not been obtained, triggering the scanning module.

Optionally, verification information for each storage device managed by the second controller is stored in the second controller.

The device further comprises a generating module and a storage module applied to the first controller.

The generating module is configured for generating a piece of verification information for each storage device determined by the determining module.

The storage module is configured for storing the verification information for each storage device generated by the generating module to the storage device, and storing the verification information for the storage device in the first controller.

The device further comprises a reading module, a determining module and an obtaining module applied to the second controller.

The reading module is configured for reading verification information in each storage device managed by the second controller after the second controller recovers.

The determining module is configured for judge whether the verification information in the storage device is the same as the verification information for the storage device stored in the second controller; if not the same, triggering the obtaining module.

The obtaining module is configured for obtaining the metadata of the storage device from the first controller.

Optionally, the device further comprises a sending module applied to the first controller.

The detecting module is further configured for detecting whether the second controller recovers, and if it recovers, triggering the sending module.

The sending module is configured for sending metadata of the storage device managed by the second controller obtained by the scanning module to the second controller.

The device further comprises a receiving module and an updating module applied to the second controller.

The receiving module is configured for receiving metadata sent by the sending module.

The update module is configured for updating metadata stored in the second controller with the received metadata.

Optionally, the detecting module may be further configured for:

sending regularly probe information to the second controller and determining whether feedback information from the second controller is received within a preset period of time after sending the probe information; if the feedback information is received, a recoverry of the second controller is determined.

To achieve the above objective, an embodiment of the present application further provides a distributed storage system, comprising at least one dual-control storage server, that comprises two controllers: a first controller and a second controller; wherein, the first controller is configured for determine a storage device managed by the second controller after detecting an abnormality of the second controller; scanning data in the determined storage device to obtain metadata of the storage device and managing the storage device.

Optionally, the system comprises a managing server and multiple storage servers, the multiple storage servers comprises the at least one dual-control storage server.

The managing server is configured for receiving to-be-stored data; segmenting the to-be-stored data into multiple data blocks; determining whether the number of storage servers in the system is less than the number of the data blocks; if the number of storage servers is less than the number of the data blocks, selecting a target dual-control storage servers from the at least one dual-control storage server; taking the target dual-control storage server as two storage servers, and storing the multiple data blocks to each storage server separately.

Optionally, the managing server may be further configured for:

calculating a difference between the number of storage servers and the number of data blocks when the number of storage servers in the system is determined to be less than the number of data blocks; and selecting, from the at least one dual-control storage servers, target dual control storage servers whose number is equal to the difference.

Optionally, the dual-control storage server may be further configured for displaying correspondence between the two controllers and the storage devices, the correspondence comprises correspondence between the first controller and storage devices under its management, and correspondence between the second controller and storage devices under its management.

The managing server may be further configured for:

receiving a data storage instruction sent by a user device, wherein the data storage instruction carries target storage device information for storing data, and the target storage device information is determined by the user device according to the correspondence between the two controllers and the storage devices displayed by the dual-control storage server; and allocating a stripe to to-be-stored data corresponding to the data storage instruction according to the target storage device information, and sending the stripe to the dual-control storage server.

The dual-control storage server is further configured for storing the to-be-stored data corresponding to the data storage instruction according to the stripe.

To achieve the above objective, an embodiment of the present application further provides a dual-control storage server comprising two controllers: a first controller and a second controller.

The first controller is configured for, determining a storage device managed by the second controller after detecting an abnormality of the second controller; scanning data in the determined storage device to obtain metadata of the storage device; upon receiving a data read instruction and determining that to-be-read data to which the data read instruction is directed to is stored in the determined storage device, reading the to-be-read data from the determined storage device by using the obtained metadata.

To achieve the above objective, an embodiment of the present application further provides a computer readable storage medium having a computer program stored thereon which, when executed by a processor, causes the processor to perform any one of the data processing methods described above.

To achieve the above objective, an embodiment of the present application further provides executable program codes which, when executed by a processor, perform any one of the data processing methods described above.

In the embodiments of the present application for data processing, in a dual-control storage server, if one controller fails due to abnormalities, the other controller determines the storage device managed by the failed controller, scans the data in the determined storage device and obtains the metadata of the storage device. The other controller then uses the metadata to read data stored in the determined storage device. It can be seen that in the solution provided by the embodiments of the present application, if one controller fails, the other controller will take the place of the failed controller to provide external services, which improves the stability of the data storage by the dual-control storage server.

BRIEF DESCRIPTION OF THE DRAWINGS

In order to explain the technical solutions in the embodiments of the present application or the prior art more clearly, the drawings used in the description of the embodiments and the prior art will be briefly introduced below. It is apparent that the drawings in the following description are merely for some embodiments of the present application. For those of ordinary skill in the art, other drawings can be obtained based on these drawings without any creative effort.

DETAILED DESCRIPTION OF THE INVENTION

In order to make the objective, technical solution and advantages of the present application more clear, the present application is described below in detail with reference to the accompanying drawings and by way of examples. Obviously, the described embodiments are only a part of the embodiments of the present application, but not all of the embodiments. Based on the embodiments in the present application, all other embodiments obtained by a person of ordinary skill in the art without any creative effort shall fall within the protection scope of the present application.

Figure 1:
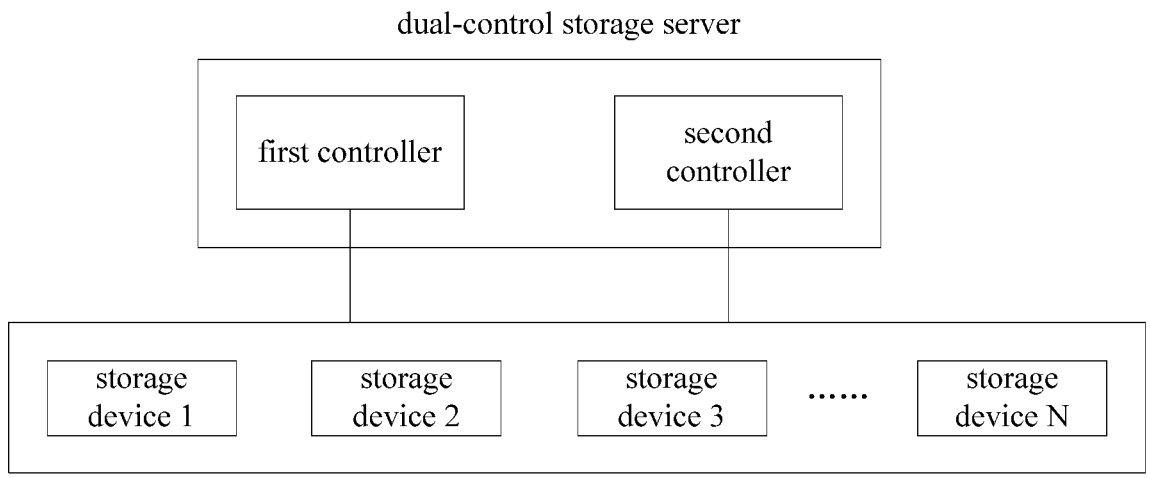
FIG. 1 shows a scenario in which a dual-control storage server according to an embodiment of the present application can be applied.

In order to solve the technical problems in the prior art, embodiments of the present application provide a data processing method and device, and a distributed storage system. The method and device is applicable to a dual-control storage server in a distributed storage system. The dual-control storage server may comprise two controllers as shown in FIG. 1, with each managing a plurality of storage devices. For ease of description, one of the controllers is referred to as a first controller, and the other controller is referred to as a second controller.

First, a data processing method provided by an embodiment of the present application will be described in detail below.

Figure 2:
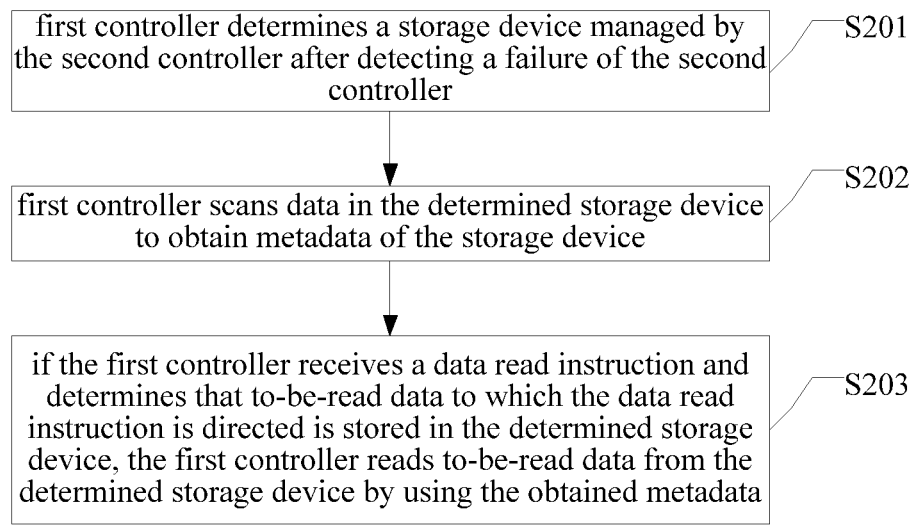
FIG. 2 is a schematic flowchart of a data processing method provided by an embodiment of the present application.

FIG. 2 is a schematic flowchart of a data processing method provided by an embodiment of the present application, comprising:

S201: the first controller determines a storage device managed by the second controller after detecting an abnormality of the second controller.

S202: the first controller scans data in the determined storage device to obtain metadata of the storage device.

S203: if the first controller receives a data read instruction and determines that to-be-read data to which the data read instruction is directed is stored in the determined storage device, the first controller reads the to-be-read data from the determined storage device by using the obtained metadata.

In the embodiments of the present application for data processing as shown in FIG. 2, in a dual-control storage server, if one controller fails due to abnormalities, the other controller determines the storage device managed by the failed controller, scans the data in the determined storage device and obtains the metadata of the storage device. The other controller then uses the metadata to read data stored in the determined storage device. It can be seen that in the solution provided by the embodiments of the present application, if one controller fails due to abnormalities, the other controller will take the place of the failed controller to provide external services, which improves the stability of the data storage by the dual-control storage server.

The embodiment shown in FIG. 2 is described in detail below.

At S201, the first controller determining a storage device managed by the second controller after detecting an abnormality of the second controller.

In one implementation, the first controller may send regularly probe information to the second controller, and judge whether feedback information from the second controller is received within a preset period of time after sending the probe information. If the feedback information is not receive, an abnormality of the second controller is determined.

For example, the first controller and the second controller may establish a heartbeat connection, send probe information to each other periodically. If feedback information from the other one is received within a preset period of time, the other one's heartbeat is normal; if feedback information from the other one is not received within a preset period of time, an abnormality of the other one is determined.

In this embodiment, there are two controllers, i.e., a first controller and a second controller. These two controllers can manage different storage devices respectively, and the two controllers detect whether the other one fails. In the embodiment, only examples in which the second controller fails are described, but it can be understood that if the first controller fails, the processing method is similar and will not be repeated.

The storage device in this embodiment may be a disk, Solid State Drives (SSD), Network Attached Storage (NAS) device, Internet Small Computer System Interface (ISCSI) device, Fibre-Channel Storage Area Network (FCSAN) device, or any other device used to store data. Embodiments are not specifically limited in this aspect.

Those skilled in the art can understand that the storage server can manage the storage device. In management, the storage server may write data in the storage device and store metadata of the written data in the storage server, read the data in the storage device according to the stored metadata, and clean regularly the data in the storage device periodically. Embodiments are not limited in this aspect.

In one implementation, the first controller may manage a storage device in an odd slot, and the second controller may manage a storage device in an even slot. In this case, if the first controller detects that the second controller fails due to abnormalities, the first controller may determine a storage device in an even slot as a storage device managed by the second controller. Alternatively, the first controller and the second controller may also divide the storage devices managed by themselves according to other methods. When the second controller fails due to abnormalities, the first controller may determine the storage device managed by the second controller according to the division method.

At S202, the first controller scans data in the determined storage device and obtains metadata of the storage device.

Metadata, i.e., data about data, mainly describes related attributes of data, and is used to support functions such as storage location indication, historical data, resource search, and file recording. For data stored in an erasure coding strategy, it is usually necessary to record strip information of the data. The strip information is metadata of the data.

Erasure coding (EC) is a data protection method. The erasure coding strategy can be represented by n=k+m, wherein k is the number of original data blocks, m is the number of redundant data blocks, and n is the total number of data blocks. Specifically, to-be-stored data can be segmented into k original data blocks, and expansion and encoding can be performed on the k original data blocks to obtain m redundant data blocks. The k original data blocks and m redundant data blocks are stored separately. In this way, if a certain data block is lost, the lost data block can be recovered according to data blocks that are not lost.

For example, assuming that the erasure coding strategy 4+1 is used to store data A, strips are allocated first as follow:

{<OSD_1, wwn_1>, <OSD_2, wwn_2>, <OSD_3, wwn_3>, <OSD_4, wwn_4>, <OSD_5, wwn_5>}, wherein, OSD represents a storage server; OSD_1, OSD_2, and the like are identifiers of storage servers; wwn represents a storage device; and wwn_1, wwn_2, and the like may be identifiers of storage devices.

According to an erasure coding strategy 4+1, data A is sliced and redundancy processing is performed on data A to obtain original data blocks and redundant data blocks. Each data block in the strip corresponds to a 4-tuple <OSD, wwn, key, value>, wherein key represents the key of the data block and value represents the value or content of the data block.

The strip information corresponding to data A is recorded as:

{<OSD_1, wwn_1, key_1, value_1>, <OSD_2, wwn_2, key_2, value_2>, <OSD_3, wwn_3, key_3, value_3>, <OSD_4, wwn_4, key_4, value_4>, <OSD_5, wwn_5, key_5, value_5>}.

In some embodiments, the recorded stripe information may not comprise identifiers of storage servers. In this case, the recorded stripe information may also be:

{<wwn_1, key_1, value_1>, <wwn_2, key_2, value_2>, <wwn_3, key_3, value_3>, <wwn_4, key_4, value_4>, <wwn_5, key_5, value_5>}.

Alternatively, in addition to the stripe information, the metadata may also contain data integrity information, and the data integrity information indicates which pieces of stripe information complete data corresponds to. For example, for data B that is large, it is divided into three pieces of data B1, B2, and B3. B1, B2, and B3 correspond to a piece of stripe information respectively; in this case, data integrity information of data B can be saved, and the data integrity information indicates that data B corresponds to three pieces of strip information.

The metadata of the data can be obtained by scanning the data stored in the storage device. It can be understood that after scanning the data in the storage device, the identifier of the storage device, the identifier of the storage server, and keys and values of data blocks can be obtained, so that they can be combined to obtain the strip information of the data, and the strip information is metadata.

Alternatively, in the above example, a piece of data B is divided into three pieces of data B1, B2 and B3. B1, B2 and B3 correspond to a piece of stripe information respectively. When these three pieces of data, B1, B2 and B3 are stored, data, they can each carry a data identifier indicating that the three pieces of data belong to a same piece of data. In this way, the data integrity information can be obtained by combination. The data integrity information is the metadata.

After the first controller determines the storage device managed by the second controller, it can scan the data in the storage device to obtain metadata of the data in the storage device, or simply referred to as metadata of the storage device.

In one implementation, before executing S202, the first controller may first determine whether the metadata in the second controller has been obtained from the second controller; if the metadata has not been obtained, the first controller may execute S202.

There are many situations where the second controller suffers from abnormalities. In some situations, the first controller cannot obtain the metadata in the second controller directly. In some situations, the first controller can obtain the metadata in the second controller directly. Therefore, the first controller may first determine whether the metadata can be obtained from the second controller, if the metadata can be obtained, then the first controller copies the metadata in the second controller directly, if the metadata cannot be obtained, then the first controller scans the data in the determined storage device to obtain the metadata.

At S203, in a case where the first controller receives a data read instruction and determines that to-be-read data to which the data read instruction is directed is stored in the determined storage device, the first controller reads the to-be-read data from the determined storage device by using the obtained metadata.

As a continuation to the above example, one piece of data B is divided into three pieces of data B1, B2, and B3. B1, B2, and B3 are stored respectively in a storage device determined by the first controller, and the metadata obtained by the first controller for the data B comprises three pieces of strip information corresponding to B1, B2 and B3, and the data integrity information of data B.

After receiving an instruction of reading the data B sent by a user, the first controller determines the storage device where the data B is located, and uses the metadata of the data B to read B1, B2, B3 respectively, and combines B1, B2, B3 into data B and feeds it back to the user.

In this embodiment, after the first controller determines the storage device managed by the second controller, the first controller may take the place of the second controller to manage the determined storage device. In one implementation, in addition to data reading in S303, management here may comprise:

in a case where the first controller receives a data storage instruction and determines that a storage device corresponding to the data read instruction is the determined storage device, the first controller storing to-be-stored data corresponding to the data storage instruction in the determined storage device.

In this embodiment, after the first controller writes data in the storage device, it may store the metadata of the written data in the first controller; based on the metadata obtained by scanning or newly stored metadata, the first controller reads data in these storage devices.

In addition, the management may also comprise cleaning the data in the storage device regularly, which is not specifically limited.

In one implementation, whenever the controller scans data in a storage device to obtain the metadata of the storage device, the controller may generate a piece of verification information for the storage device. The controller stores the verification information in the storage device, and stores the verification information for the storage device in its own controller. In this way, each controller stores the verification information corresponding to each storage device under its management.

For example, the verification information may be a pseudo-random number. The pseudo-random number is different from other numerical values present in the storage device. The controller may store the pseudo-random number and the identifier of the storage device correspondingly.

In this implementation, after S202, the method may further comprise, the first controller generates a piece of the verification information for each determined storage device, stores the verification information for the storage device to the storage device, and stores the verification information for the storage device in the first controller.

In this implementation, if the second controller recovers, the second controller may read the verification information in each storage device under its management; determine whether the verification information in the storage device is the same as the verification information for the storage device stored in the second controller. If they are different, the second controller obtains the metadata of the storage device from the first controller.

It can be understood that after an abnormality in second controller is detected, the first controller scans each storage device managed by the second controller to generate metadata for each storage device. If the second controller recovers during the scanning process, the first controller may only scan some of storage devices. As such, the first controller only obtains metadata of some of the storage devices, and only generates verification information for some of the storage devices. only some of the storage devices have their verification information changed.

In this case, after the second controller recovers, it reads the verification information for each of storage devices under its management, and determines whether the verification information in the storage device is the same as the verification information stored in the second controller. If they are the same, it is determined that the first controller has not obtained the metadata of the storage device, or has not obtained all the metadata of the storage device, and thus the verification information for the storage device has not been generated. If they are different, it is determined that the first controller has obtained the metadata for the storage device and has generated the verification information for the storage device.

In a case where they are determined to be the same, the second controller may directly take over the first controller to manage the storage device. In a case where they are determined to be different, the second controller can obtain the metadata of the storage device from the first controller, and then takes over the first controller to manage the storage device. In this way, the second controller does not need to scan the data in the storage device and does not need to regenerate metadata. This reduces the recovery time and improves the recovery efficiency.

Alternatively, in one implementation, after detecting that the second controller has recovered, the first controller may send the obtained metadata of the storage device managed by the second controller to the second controller.

As described above, the two controllers can send regularly probe information to each other. After detecting an abnormality of the second controller, the first controller can still send probe information to the second controller regularly and determines whether feedback information from the second controller is received within a preset period of time after sending the probe information. If received, a recovery of the second controller is determined. In this case, the first controller sends the obtained metadata of the storage device managed by the second controller to the second controller.

After receiving the metadata, the second controller uses the received metadata to update the metadata stored in the second controller. Specifically, the metadata may carry an identifier of the storage device, and the second controller replaces the metadata stored in the second controller with the received metadata according to the identifier of the storage device.

For example, suppose that the second controller manages 10 storage devices wwn_1-wwn_10. After an abnormality occurs in the second controller, the first controller scans these storage devices in the order from wwn_1 to wwn_10. After scanning the storage device wwn_5 to obtain the metadata of wwn_5, it is detected that the second controller recovers. The first controller sends the obtained metadata for the five storage devices to the second controller.

The identifiers of storage devices carried by the metadata received by the second controller comprise wwn_1, wwn_2, wwn_3, wwn_4, and wwn_5. This indicates that the metadata is the metadata of the five storage devices. The metadata of the ten storage devices wwn_1-wwn_10 are stored in the second controller. In this case, the second controller replaces the metadata of the five storage devices wwn_1-wwn_5 stored by itself with the received metadata of the five storage devices.

In this way, the second controller does not need to scan the data in the storage device and does not need to regenerate metadata. This reduces recovery time and improves recovery efficiency.

Figure 3:
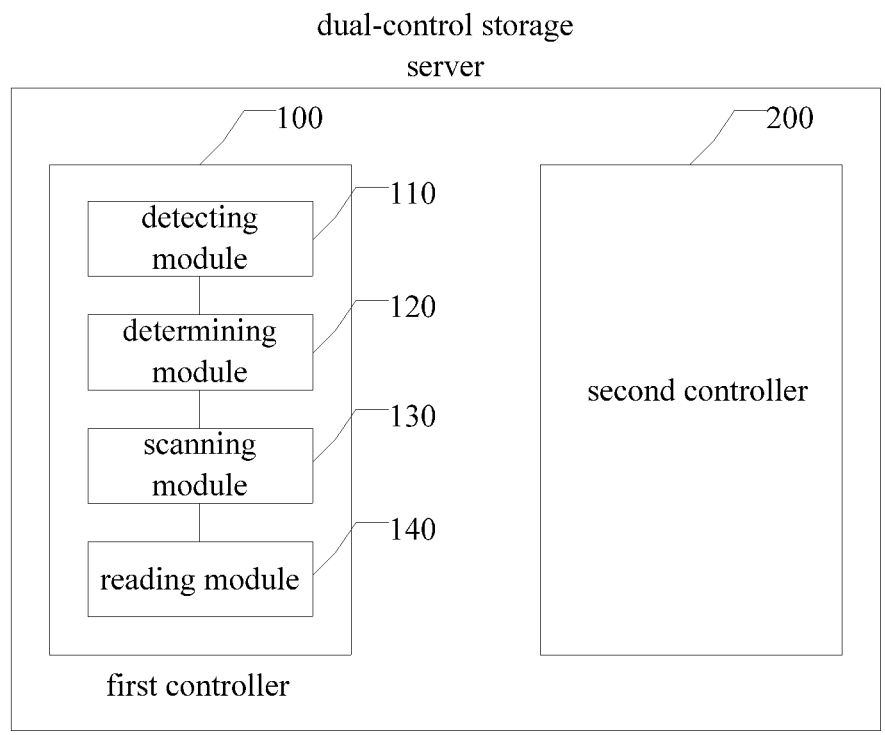
FIG. 3 is a schematic structural diagram of a data processing device provided by an embodiment of the present application.

Corresponding to the above method embodiment, an embodiment of the present application also provides a data processing device, as shown in FIG. 3, which is applied to a dual-control storage server in a distributed storage system. The dual-control storage server comprises two controller, i.e., a first controller 100 and a second controller 200. The device comprises a detecting module 110, a determining module 120, a scanning module 130 and a reading module 140 applied to the first controller 100.

The detecting module 110 is configured for detecting an abnormality of the second controller, and triggering the determining module 120 if an abnormality is detected.

The determining module is configured for determining a storage device managed by the second controller.

The scanning module is configured for scanning data in the storage device determined by the determining module 120 to obtain metadata of the storage device.

The reading module 140 is configured for, upon receiving a data read instruction and determining that to-be-read data to which the data read instruction is directed is stored in the storage device determined by the determining module 120, reading the to-be-read data from the determined storage device by using the metadata obtained by the scanning module 130.

In one implementation, the device further comprises a storage module (not shown in the figures) applied to the first controller, the storage module is configured for, upon receiving a data storage instruction and determining that a storage device corresponding to the data storage instruction is the storage device determined by the determining module, storing to-be-stored data corresponding to the data storage instruction in the determined storage device.

In one implementation, the detecting module 110 may be specifically configured for:

sending regularly probe information to the second controller, and determining whether feedback information from the second controller is received within a preset period of time after sending the probe information; if no feedback information is received, an abnormality of the second controller is detected.

In one implementation, the device further comprises a judging module (not shown in the figures) applied to the first controller.

The judging module is configured for determining whether the first controller has obtained, from the second controller, metadata stored therein; if the metadata has not been obtained, triggering the scanning module 130.

In one implementation, verification information for each storage device managed by the second controller is stored in the second controller.

The device further comprises a generating module and a storage module (not shown in the figures) applied to the first controller.

The generating module is configured for generating a piece of verification information for each storage device determined by the determining module.

The storage module is configured for storing the verification information for each storage device generated by the generating module to the storage device, and storing the verification information for the storage device in the first controller.

The device further comprises a reading module, a determining module and an obtaining module (not shown) applied to the second controller.

The reading module is configured for reading verification information in each storage device managed by the second controller after the second controller recovers.

The determining module is configured for judge whether the verification information in the storage device is the same as the verification information for the storage device stored in the second controller; if not the same, triggering the obtaining module.

The obtaining module is configured for obtaining the metadata of the storage device from the first controller.

In one implementation, the device may further comprise a sending module (not shown in the figures) applied to the first controller.

The detecting module 110 may also be configured for detecting whether the second controller recovers, and triggering the sending module if the second controller recovers.

The sending module is configured to send metadata of the storage device under the management of the second controller obtained by the scanning module to the second controller.

The device further comprises a receiving module and an updating module (not shown in the figures) applied to the second controller.

The receiving module is configured for receiving metadata sent by the sending module.

The update module is configured for updating metadata stored in the second controller with the received metadata.

In one implementation, the detection module 110 may also be configured for:

sending regularly probe information to the second controller and determining whether feedback information from the second controller is received within a preset period of time after sending the probe information; if the feedback information is received, a recovery of the second controller is determined.

In the data processing device provided in the embodiment of the present application, the modules comprised in the first controller 100 and the second controller 200 may be the same. In the above embodiment, only the abnormality in the second controller is taken as an example for explanation. If the abnormality occurs in first controller fails due to abnormalities, the steps performed by each module are similar and are thus not be repeated here.

An embodiment of the present application further provides a distributed storage system, comprising at least one dual-control storage server. The dual-control storage server comprises two controllers, i.e., a first controller and a second controller.

The first controller is configured for determining a storage device managed by the second controller after detecting an abnormality of the second controller; scanning data in the determined storage device to obtain metadata of the storage device and managing the storage device.

The dual-control storage server in the system shown in this embodiment can execute any of the above data processing methods.

Figure 4:
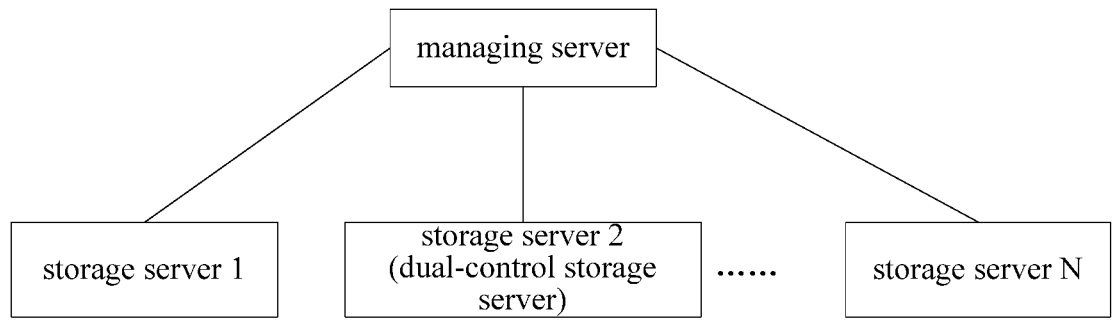
FIG. 4 is a schematic structural diagram of a distributed storage system provided by an embodiment of the present application.

In one implementation, the distributed storage system may comprise, as shown in FIG. 4, a managing server and a plurality of storage servers, wherein the multiple storage servers comprises at least one dual-control storage server.

The managing server is configured for receiving to-be-stored data; segmenting the to-be-stored data into multiple data blocks; determining whether the number of storage servers in the system is less than the number of the data blocks; if the number of storage servers is less than the number of the data blocks, selecting a target dual-control storage server from the at least one dual-control storage server; taking the target dual-control storage server as two storage servers, and storing the multiple data blocks to each storage server separately.

For example, if the erasure coding strategy is used to store data, the managing server performs segmentation and redundancy processing on the stored data. Suppose that data A is stored in an erasure coding strategy 4+1, and the managing server performs data segmentation and redundancy processing on data A to obtain five data blocks.

Assume that the distributed storage system contains eight storage servers, then the number of storage servers is not less than the number of data blocks. In this case, the managing server selects five storage servers from the eight storage servers and sends the five data blocks to these five storage servers for storage, with each storage server storing a data block.

Assume that the distributed storage system contains four storage servers, then the number of storage servers is less than the number of data blocks. Suppose that these four storage servers comprise a dual-control storage server. In this case, the managing server takes the dual-control storage server as two storage servers, so that the number of storage servers in the system is five, and the managing server sends the five data blocks to the five storage servers for storage, with each storage server storing one data block.

In one implementation, the managing server calculates a difference between the number of storage servers and the number of data blocks when the number of storage servers in the system is determined to be less than the number of data blocks; and selecting, from dual-control storage servers, target dual control storage servers whose number is equal to the difference.

As another example, assume that the distributed storage system comprises four storage servers, then the number of storage servers is less than the number of data blocks, and the difference is one. Assuming that these four storage servers comprise three dual-control storage servers, then the managing server selects one target dual-control storage server from the three dual-control storage servers, and takes this target dual-control storage server as two storage servers, so that the number of storage servers in the system is five. The managing server sends these five data blocks to these five storage servers for storage, with each storage server storing one data block.

In other words, if the number of storage servers in the system is greater than or equal to the number of data blocks, the managing server takes the dual-control storage server as one storage server. If the number of storage servers in the system is less than the number of data blocks, the managing server will take the dual-control storage server as two storage servers. In addition, the managing server may take any number of dual-control storage servers as two storage servers according to the difference between the number of storage servers and the number of data blocks in the system. In this way, storage resources can be used in balance.

In one implementation, the dual-control storage server may also be used to display correspondence between the two controllers and the storage devices. The correspondence comprises correspondence between the first controller and the storage devices under its management, as well as the correspondence between the second controller and the storage devices under its management.

The managing server may also be configured for:

receiving a data storage instruction sent by a user device, wherein the data storage instruction carries target storage device information for storing data, and the target storage device information is determined by the user device according to the correspondence between the two controllers and the storage devices displayed by the dual-control storage server; and allocating a stripe to to-be-stored data corresponding to the data storage instruction according to the target storage device information, and sending the stripe to the dual-control storage server.

The dual-control storage server is further configured for storing the to-be-stored data corresponding to the data storage instruction according to the stripe.

In this implementation, the dual-control storage server displays intuitively the two controllers and the storage devices under their management to the user. The user can select a storage device to store data according to the displayed content. It can be seen that this implementation realizes the transparency of information, and enables users to select a storage device under the management of the controllers according to their own needs.

An embodiment of the present application further provides a dual-control storage server, as shown in FIG. 1, comprising two controllers, i.e., a first controller and a second controller.

The first controller is configured for determining a storage device managed by the second controller after detecting an abnormality of the second controller, scanning data in the determined storage device to obtain metadata of the storage device; upon receiving a data read instruction and determining that to-be-read data to which the data read instruction is directed to is stored in the determined storage device, reading the to-be-read data from the determined storage device through the obtained metadata.

The dual-control storage server in this embodiment can execute any of the above data processing methods.

In this embodiment of the present application, if one controller of a dual-control storage server fails due to abnormalities, the other controller determines storage devices managed by the failed controller, and scans the data in the determined storage devices to obtain metadata of the storage devices, and uses the metadata to read the data stored in the determined storage devices. It can be seen that in this solution, if one controller fails, the other controller will take the place of the failed controller to provide external services. This improves the stability of the data storage performed by the dual-control storage server.

An embodiment of the present application further provides a computer-readable storage medium having a computer program stored thereon which, when executed by a processor, causes the processor to perform any one of the foregoing data processing methods.

An embodiment of the present application further provides executable program codes which, when executed, performs any one of the foregoing data processing methods.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "comprise," "contain" or any other variants are intended to cover a non-exclusive inclusion, such that processes, methods, objects or devices comprising a series of elements comprise not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

The various embodiments in this specification are described in a related manner. Same or similar parts among the various embodiments can be referred to each other, and each embodiment focuses on the differences from other embodiments. In particular, for the embodiment of the data processing device, the embodiment of the distributed storage system, the embodiment of the dual-control storage server, the embodiment of the computer-readable storage medium described above, and the embodiment of the executable program codes described above, since they are basically similar to the embodiments of the data processing method, the description is relatively simple. For the relevant parts, reference can be made to the part description of the embodiments of the data processing method.

The above descriptions are merely preferred embodiments of the present application, and are not intended to limit the protection scope of the present application. Any modification, equivalent replacement, and improvement made within the spirit and principle of this application fall within the protection scope of this application.

The invention claimed is:

1. A data processing method, executed by a dual-control storage server in a distributed storage system, wherein the dual-control storage server comprises two controllers: a first controller and a second controller, and the method comprises:
   the first controller determining a storage device managed by the second controller after detecting an abnormality of the second controller;
   the first controller scanning data in the determined storage device to obtain metadata of the determined storage device; and
   in a case where the first controller receives a data read instruction and determines that data to which the data read instruction is directed is stored in the determined storage device, the first controller reading the data from the determined storage device by using the obtained metadata;
   wherein, verification information for the storage device managed by the second controller is stored in the second controller, wherein the verification information is a pseudo-random number used to verify the storage device;
   after the first controller scanning data in the determined storage device to obtain metadata of the determined storage device, the method further comprises:
   the first controller generating verification information for the determined storage device managed by the second controller, storing the generated verification information for the determined storage device into the storage device, and storing the generated verification information for the determined storage device in the first controller; wherein the generated verification information for the determined storage device is a pseudo-random number different from other numerical values present in the determined storage device;
   after the second controller recovers, the method further comprises:
   the second controller reading verification information in the storage device managed by the second controller; determining whether the verification information in the determined storage device is the same as the verification information for the storage device stored in the second controller; if not the same, obtaining the metadata of the determined storage device from the first controller.

2. The method according to claim 1, wherein, after the first controller determining a storage device managed by the second controller, the method further comprises:
   in a case where the first controller receives a data storage instruction and determines that a storage device corresponding to the data read instruction is the determined storage device, the first controller storing data corresponding to the data storage instruction in the determined storage device.

3. The method according to claim 1, wherein, the first controller detecting an abnormality of the second controller comprises:
   the first controller sending regularly probe information to the second controller, and determining whether feedback information from the second controller is received within a preset period of time after sending the probe information; if no feedback information is received, an abnormality of the second controller is detected.

4. The method according to claim 1, wherein, before the first controller scanning data in the determined storage device to obtain metadata of the determined storage device, the method further comprises:
   the first controller determining whether metadata in the second controller has been obtained from the second controller; if the metadata has not been obtained, the first controller executes the step of scanning data in the determined storage device to obtain metadata of the determined storage device.

5. The method according to claim 1, wherein, after the first controller scanning data in the determined storage device to obtain metadata of the determined storage device, the method further comprises:
   after detecting a recovery of the second controller, the first controller sending the obtained metadata of the storage device managed by the second controller to the second controller; and
   the second controller receiving the metadata sent by the first controller, updating metadata stored in the second controller with the received metadata.

6. The method according to claim 5, wherein, the first controller detecting a recovery of the second controller comprises:
   the first controller sending regularly probe information to the second controller and determining whether feedback information from the second controller is received within a preset period of time after sending the probe information; if the feedback information is received, a recovery of the second controller is determined.

7. A distributed storage system, comprising at least one dual-control storage server, wherein, the dual-control storage server comprises two controllers: a first controller and a second controller; wherein,
   the first controller is configured for determining a storage device managed by the second controller after detecting an abnormality of the second controller; scanning data in the determined storage device to obtain metadata of the determined storage device and managing the determined storage device;
   wherein, verification information for the storage device managed by the second controller is stored in the second controller, wherein the verification information is a pseudo-random number used to verify the storage device;

after the first controller scanning data in the determined storage device to obtain metadata of the determined storage device, the method further comprises:

the first controller generating verification information for the determined storage device managed by the second controller, storing the generated verification information for the determined storage device into the storage device, and storing the generated verification information for the determined storage device in the first controller; wherein the generated verification information for the determined storage device is a pseudo-random number different from other numerical values present in the determined storage device;

after the second controller recovers, the method further comprises:

the second controller reading verification information in the storage device managed by the second controller; determining whether the verification information in the determined storage device is the same as the verification information for the storage device stored in the second controller; if not the same, obtaining the metadata of the determined storage device from the first controller.

8. The system according to claim 7, wherein the system comprises a managing server and multiple storage servers, the multiple storage servers comprises the at least one dual-control storage server; wherein, the managing server is configured for receiving data; segmenting the data into multiple data blocks; determining whether the number of storage servers in the system is less than the number of the data blocks; if the number of storage servers is less than the number of the data blocks, selecting a target dual-control storage server from the at least one dual-control storage server; taking the target dual-control storage server as two storage servers, and storing the multiple data blocks to each storage server separately.

9. The system according to claim 8, wherein the managing server is further configured for:

calculating a difference between the number of storage servers and the number of data blocks when the number of storage servers in the system is determined to be less than the number of data blocks; and selecting, from the at least one dual-control storage server, target dual control storage servers whose number is equal to the difference.

10. The system according to claim 8, wherein the dual-control storage server is further configured for displaying correspondence between the two controllers and the storage devices, the correspondence comprises correspondence between the first controller and storage devices under its management, and correspondence between the second controller and storage devices under its management;

the managing server is further configured for:

receiving a data storage instruction sent by a user device, wherein the data storage instruction carries target storage device information for storing data, and the target storage device information is determined by the user device according to the correspondence between the two controllers and the storage devices displayed by the dual-control storage server; and allocating a stripe to data corresponding to the data storage instruction according to the target storage device information, and sending the stripe to the dual-control storage server;

the dual-control storage server is further configured for storing the data corresponding to the data storage instruction according to the stripe.

11. A dual-control storage server, comprising two controllers: a first controller and a second controller;

the first controller is configured for, determining a storage device managed by the second controller after detecting an abnormality of the second controller; scanning data in the determined storage device to obtain metadata of the determined storage device; upon receiving a data read instruction and determining that data to which the data read instruction is directed to is stored in the determined storage device, reading the data from the determined storage device by using the obtained metadata;

wherein, verification information for the storage device managed by the second controller is stored in the second controller, wherein the verification information is a pseudo-random number used to verify the storage device;

after the first controller scanning data in the determined storage device to obtain metadata of the determined storage device, the method further comprises:

the first controller generating verification information for the determined storage device managed by the second controller, storing the generated verification information for the determined storage device into the storage device, and storing the generated verification information for the determined storage device in the first controller; wherein the generated verification information for the determined storage device is a pseudo-random number different from other numerical values present in the determined storage device;

after the second controller recovers, the method further comprises:

the second controller reading verification information in the storage device managed by the second controller; determining whether the verification information in the determined storage device is the same as the verification information for the storage device stored in the second controller; if not the same, obtaining the metadata of the determined storage device from the first controller.

12. A non-transitory computer readable storage medium having a computer program stored thereon which, when executed by a processor, causes the processor to perform the method of claim 1.

* * * * *